(12) United States Patent
Hibbert (10) Patent No.: US 6,431,123 B1
(45) Date of Patent: Aug. 13, 2002

(54) PROTECTIVE COVERINGS FOR ANIMALS

(76) Inventor: Bette S. Hibbert, 950 Brookmere St., Edmonds, WA (US) 98020-2611

( * ) Notice: Subject to any disclaimer, the term of this patent is extended or adjusted under 35 U.S.C. 154(b) by 0 days.

(21) Appl. No.: 09/588,441

(22) Filed: Jun. 6, 2000

Related U.S. Application Data (63) Continuation-in-part of application No. 09/209,913, filed on Dec. 11, 1998, now Pat. No. 6,070,557.
(60) Provisional application No. 60/070,928, filed on Dec. 11, 1997.

(51) Int. Cl.⁷ .............................................. A01K 13/00
(52) U.S. Cl. ...................................... 119/850; 119/728
(58) Field of Search ............................... 119/497, 728, 119/850, 854, 856; 54/79.1, 79.2, 79.4

(56) References Cited

U.S. PATENT DOCUMENTS

| | | | |
|---|---|---|---|
| 1,772,827 A | 8/1930 | Caster-Udell | 119/850 X |
| 2,103,109 A | 12/1937 | De Mar | 119/850 X |
| 2,222,705 A | 11/1940 | Conlon | 119/850 X |
| 3,141,443 A | 7/1964 | Huey | 54/79.4 X |
| 3,895,628 A | 7/1975 | Adair | 128/171 |
| 4,355,600 A | 10/1982 | Zielinski | 119/850 |
| 4,489,676 A | 12/1984 | Colquist | |
| 4,510,888 A | * 4/1985 | DeAngelis et al. | 54/82 X |
| 4,530,309 A | * 7/1985 | Collins | 119/728 X |
| 4,644,902 A | * 2/1987 | Doyle | 119/497 |
| D312,151 S | 11/1990 | Dickey | D30/145 |
| 5,137,508 A | 8/1992 | Engman | 602/79 |
| 5,193,486 A | * 3/1993 | Kitchens | 119/856 X |
| 5,307,764 A | 5/1994 | Moy | 119/815 |
| 5,458,094 A | 10/1995 | Proshan | 119/850 |
| 5,463,985 A | 11/1995 | Shover | 119/850 |
| D368,338 S | 3/1996 | Levengood | D30/144 |
| 5,632,235 A | * 5/1997 | Larsen et al. | 119/856 |

* cited by examiner

Primary Examiner—Robert P. Swiatek
(74) Attorney, Agent, or Firm—Michael R. Schacht; Schacht Law Office, Inc.

(57) ABSTRACT

A cover for animals. The cover comprises a main body, a strap member sewn to main body, and a fastening system arranged to join two edges of the main body. So joined, main body extends around at least a portion of the animal, portions of the animal extend through first and second open ends of the main body, and the strap member extends under the animal with first and second side portions of the strap member arranged above the animal. Grasping the side portions of the strap member allows the animal to be lifted with the weight of the animal being carried at least in part by the strap member.

17 Claims, 6 Drawing Sheets

PROTECTIVE COVERINGS FOR ANIMALS

RELATED APPLICATIONS

This is a continuation-in-part of U.S. Ser. No. 09/209,913 filed on Dec. 11, 1998, now U.S. Pat. No. 6,070,557, which claims priority of U.S. Provisional Patent Application Serial No. 60/070,928 filed on Dec. 11, 1997.

TECHNICAL FIELD

The present invention relates to apparatus and methods for covering animals and, in particular, such apparatus and methods that are adapted to cover animal wounds and/or to facilitate lifting of a sick, wounded, or infirm animal.

BACKGROUND OF THE INVENTION

It has long been recognized that wounds should be protected while healing. For example, a bandage is applied to a laceration to physically support the skin at the laceration and to reduce chance of infection. The term "wound" is broadly defined herein to describe any internal (e.g., broken bone) or external (e.g., laceration) injury caused by sickness or intentional (e.g., surgery) or unintentional trauma. Examples of wounds include skin and coat disorders, pre-surgical (operative) care, post-surgical (operative) aftercare, lacerations, abrasions, incisions, skin irritation, broken bones, and the like. The term "cover" when used herein as a noun refers to a fabric member that covers at least a portion of an animal. In this sense, a cover may form, or may be used in conjunction with, a splint, bandage, stitching, dressing, cast, or other member or material.

The present invention relates to covers that are particularly suited for use on animals, and that application will be described herein in detail. The present invention may also have application to humans, however, so the scope of the present invention should be determined by the claims appended hereto and not the following detailed description.

Conventional covers for animals are simply adaptations of similar covers for humans. Sterile guaze bandages, white plaster casts, and stitches developed for humans are all applied to animals.

But the covering of a wound presents unique problems when the wound is on an animal. Initially, the animal cannot be expected to cooperate in the healing process. One cannot instruct the animal to "stay in bed" during the healing process or to call for help if a cover begins to fall off. To the contrary, an animal may have natural instincts that cause it to act in a manner that is detrimental to the healing process. For example, an animal may lick, bite, or scratch a wound following surgery; this licking may harm surgical stitches and increases the likelihood of infection. An animal may also scratch at a bandage that causes discomfort.

In addition, the physical structure of the animal may not be conducive to the application of currently available covers. For example, the hind leg of a dog is often configured such that a wrapped bandage or dressing will tend to slide down when the animal moves around or, if applied too tautly, may inhibit blood circulation. And the simple fact that most animals have fur, hair, feather, or scales means that the class of covers that employ adhesives is far less effective when applied to animals, without intrusive measures such as extensive shaving or without the adhesive causing further injury.

Conventional covers not only present physical problems when applied to animals, but they can also cause psychological problems that are more intense in animals. A conventional cover may make the animal to which the cover is applied feel isolated and vulnerable, especially when with other animals. And other animals often will act aggressively towards the animal wearing a cover because the wounded animal looks different.

Methods developed specifically for covering wounds on animals include the device commonly referred to as an "Elizabethan collar". The Elizabethan collar comprises a thin plastic cone worn with its narrow end about the animal's neck and the wide end extends towards the animal's face. The Elizabethan collar inhibits the animal's ability to bite or lick its wound but can interfere with the animal's vision, eating, drinking, self grooming, and play.

Another common method of covering animal wounds is to use a tee shirt designed for infants or small children. Usually, the two front legs are inserted through the sleeves of the shirt to hold the shirt in place. This method is ineffective in many situations. First, a tee shirt made for a child does not closely conform to the animal's body. The animal can easily move the shirt from over the wound and then lick, bite, or scratch the wound. A tee shirt also covers only a portion of the animal's torso, usually leaving the hind quarters unprotected. And some animals are simply too small for even the smallest infant's tee shirt. The fabric from which infant's tee shirts are made usually contain natural fibers that cannot withstand the wear and tear of an active animal.

Conventional covers used by veterinarians, such as those developed for use on humans, Elizabethan collars, and infant tee shirts, all have drawbacks when used on animals, and the need thus exists for improved covers for animals.

RELATED ART

A professional patentability search conducted on behalf of the applicant uncovered the following U.S. Patents:

U.S. Pat. No. 5,307,764 to Moy discloses a sheet of material that extends around an animal's neck to inhibit the animal's ability to bite or lick a wound.

U.S. Pat. No. 5,137,508 to Engman discloses an animal bandage comprising a sheet of material adapted to be wrapped around the animal and secured along two edges with a fastening means such as a hook and loop fastener.

U.S. Pat. No. 4,510,888 to DeAngelis et al. discloses a shield for animals that is wrapped around an area of the animal to be protected. This device comprises two hinged sections that are secured in a closed position around the animal and fastened together.

U.S. Pat. No. 4,489,676 to Colquist discloses a canine jacket having a foam plastic insert that inhibits the animal's ability to bite or lick a wound.

U.S. Pat. No. 4,355,600 to Zielinski discloses a protective body suit for animals. This suit is substantially tailored for a particular size of animal and requires a connecting means such as a zipper, hook and loop fastener, and tie, or the like to maintain the suit on the animal.

U.S. Pat. No. 3,895,628 to Adair discloses a bandage for animals that is initially configured as a flat sheet and then is wrapped partially around the animal and tied to secure the sheet on the animal.

U.S. Pat. No. 3,141,443 to Huey discloses a protective cover for dogs comprising a flat sheet with leg holes that is fastened around the dog with fasteners spaced along the back of the dog.

U.S. Pat. No. 1,772,827 to Caster-Udell discloses a dog blanket of elastic material that is tailored for a particular size of animal and employs a zipper that extends along the back of the animal to allow the blanket to be put on and taken off.

U.S. Pat. No. Des. 368,338 to Levengood discloses an ornamental design for a protective garment for dogs and cats.

U.S. Pat. No. Des. 312,151 to Dickey discloses an ornamental design for a protective garment for canines.

These devices are all relatively expensive to manufacture and thus are impractical for use as disposable items on a large scale. The complexity of the devices disclosed in the prior art render them difficult to put on and take off, especially for a non-professional.

SUMMARY OF THE INVENTION

The present invention is a protective covering for animals. The cover is made of an elastic, breathable material that stretches and then recovers to snugly fit the animal.

In one exemplary embodiment of the present invention, the cover preferably comprises a main body in the form of a hollow cylinder having open ends in which two or four appendage openings are formed. The cover may further include one or more appendage extensions that are attached to the main body at the appendage openings such that an appendage, such as a leg or tail, of the animal is received within the appendage extension. The appendage extension thus covers and protects a wound on the appendage.

In another exemplary embodiment, the protective cover of the present invention is designed to be easily placed onto and removed from the animal. The present invention may thus also be embodied in a method for covering a wound on an animal in which the cover is pulled over a portion of the animal, such as the animal's head or tail, and then onto the portion of the animal to be covered.

In yet another embodiment, the protective cover of the present invention is provided with straps to allow a sick, wounded, or infirm animal to be lifted. In certain animals, age, wounds, or sickness make it difficult for the animal to stand on its own. The protective cover of the present invention can be configured with a seam along the animal's back and straps that extend under the animal to allow a person to grasp the straps and lift the animal to its feet. This embodiment has many of the advantages of the embodiments described above in addition to the advantage of assisting the animal to stand.

The protective cover of the present invention is comfortable for the animal, does not interfere with the animal's vision, allows freedom of movement to the animal, and does not require removal for the animal to eat, drink, groom, or play. The protective cover of the present invention can be put on and taken off by a non-professional. The simplicity of the cover of the present invention also means that it can be manufactured inexpensively and efficiently in large quantities and may be disposed of rather than reused.

An important benefit of the present invention is that the elasticity of the cover holds the cover snugly against the animal. In contrast to prior art covers that do not snugly fit the animal, the cover of the present invention "hugs" the animal in a manner that appears to comfort the animal. This comforting of the animal can be an important factor in the animal's tolerance of treatment and eventual recovery.

DETAILED DESCRIPTION OF THE INVENTION

The present invention can be embodied in any one of a large number of variations. In the following discussion, certain important embodiments of the present invention will be discussed with the understanding that the scope of the present invention may include embodiments not specifically described herein. In particular, the present invention has application to many types of animals, from birds and reptiles to mammals such as dogs and cats. The present invention also has application to many sizes of animals, and can be manufactured in sizes that fit mice and sizes that fit elephants. But perhaps the most common use of the present invention will be on cats and dogs, so those applications of the present invention will be discussed herein.

I. First Embodiment

Figure 1:
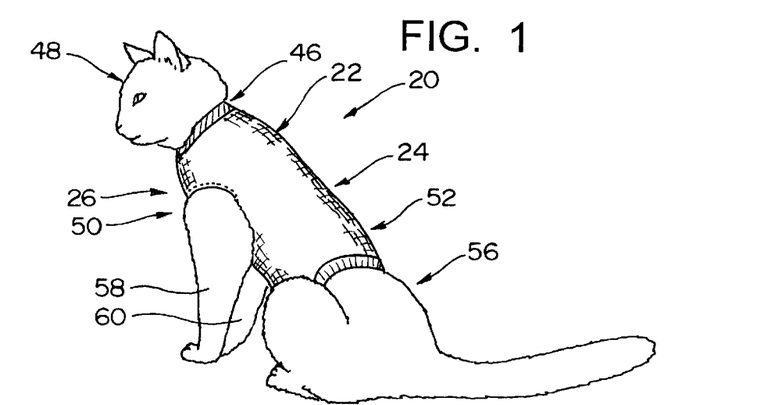
FIG. 1 is a perspective view of a cat wearing a first embodiment of a cover of the present invention.
Figure 2:
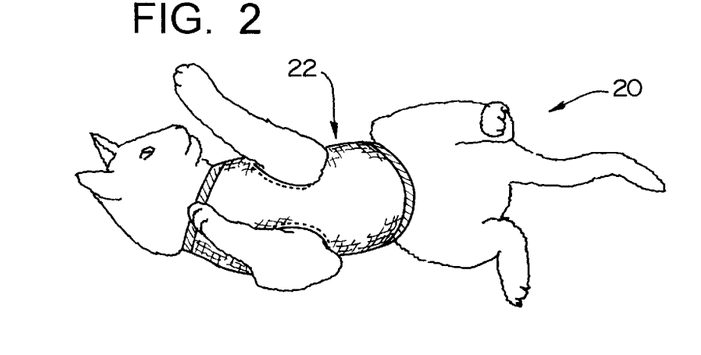
FIG. 2 is another perspective view of a cat wearing the cover of FIG. 1.

Referring initially to FIG. 1, depicted at 20 therein is an animal wearing a cover 22 constructed in accordance with, and embodying, the principles of the present invention. The exemplary animal 20 is a cat. The cat 20 has a torso 24, and the exemplary cover 22 is designed to cover the front quarters 26 of the cat's torso 24. FIG. 2 illustrates that the cover 22 stays firmly in place on the cat 20 even if the cat 20 rolls during normal play.

Figures 3, 4A:
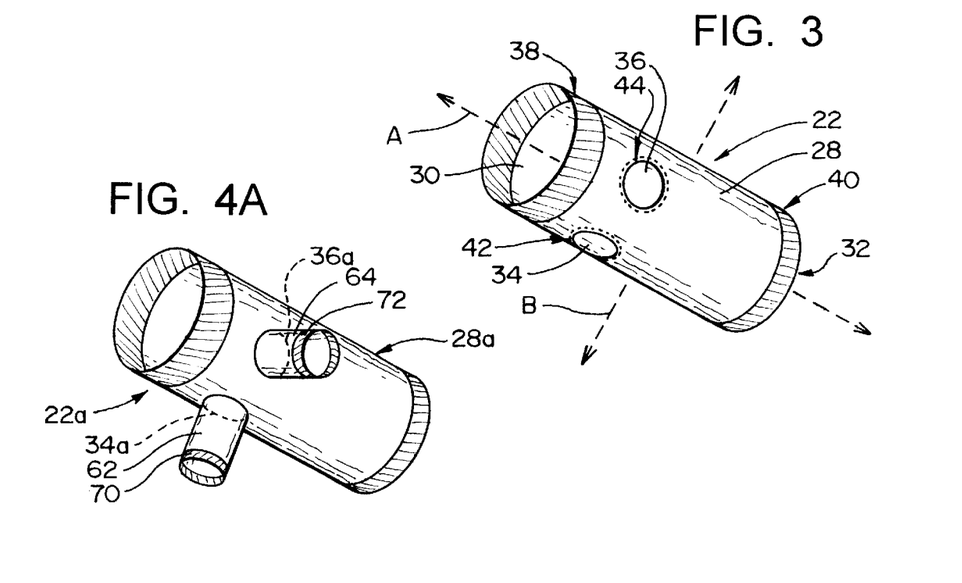
FIG. 3 is a perspective view depicting the cover of FIG. 1 when it is not on the cat.
FIGS. 4A, 4B are perspective views depicting a cover of a second embodiment of the present invention.

FIG. 3 illustrates that the cover 22 comprises a main body 28 having an open front end 30 and an open rear end 32. The main body 28 is generally tubular or cylindrical and is made from a woven or knitted material. In addition, first and second leg holes 34 and 36 are formed in the main body 28.

First, second, third, and fourth portions 38, 40, 42, and 44 of the main body 28 are banded. The first and second banded portions 38 and 40 define the front and rear ends 30 and 32, respectively, while the third and fourth banded portions define the first and second leg holes 34 and 36, respectively.

The term "banding" is used herein to refer to any fabric treatment that prevents the fabric from which the cover 22 is fabricated from running or otherwise unraveling after the fabric is cut. The banding may be formed by such methods as sewing, knitting, or coating. In the exemplary cover 22, the banding is formed by sewing a portion of the fabric back upon itself and/or by a special weave or knit integrally formed into the fabric. Another method of forming the banding is to spray or apply onto the fabric a liquid that dries to form a flexible protective coating where the fabric is to be cut.

The banded portions 38–44 thus inhibit tearing and/or unraveling of the fabric from which the cover 22 is made; these banded portions 38–44 also help maintain the form of the cover 22 and help secure the position of the cover 22 on the animal.

The first banded portion 38 is arranged to fit around the cat's neck 46 between the cat's head 48 and front shoulders 50. The second banded portion 40 is arranged to fit around the cat's midsection 52 between the cat's front shoulders 50 and the cat's hind quarters 56. The leg holes 34 and 36 are arranged such that the cat's front legs 58 and 60 pass through these holes 34 and 36. The cover 22 is thus held snugly against the cat 20 and covers the cat's entire front quarters 26 during normal use.

The cover 22 covers a wound (not shown) somewhere on the cat's front quarters 26. The cat 22 is prevented from directly licking or scratching the wound because the wound is protected by the cover 22. Although an animal could attempt to lick or scratch the wound through the cover 22, experience has shown that this is not likely. The material from which the cover 22 is made is not pleasant to lick, and the animal's claws tend to pull on the material, interfering with the scratching motion.

The animal's urge to lick the cover 22 can further be reduced by impregnating the cover with a flavor that is distasteful to the animal. For example, a bitter apple flavor will dissuade licking by a dog, while a citrus flavor will dissuade licking by a cat.

The cover 22 may be used by itself to, for example, prevent the cat 20 from licking or scratching an irritated portion of the cat's skin. Often, the cover 22 will be used in conjunction with another treatment, such as topically applied medicines, stitches, dressings, bandages, splints, and/or the like, to prevent the animal from licking or scratching the underlying treatment.

In addition, the other treatment can be incorporated into the cover 22. For example, dressings, bandage material, and/or a splint may be sewn in to the interior of the cover 22 at a location corresponding to the area to be treated, with the cover 22 holding the dressings or bandage material in place over the area to be treated. Or the cover 22 may be impregnated, either at a specific location or entirely, with a medicinal material such as an antimicrobial agent or the like.

The cover 22 is placed on the cat 20 in much the same way as a human would put on a pullover shirt. The cat's head 48 is inserted first through the second opening 32 and then the first opening 30. The cover 22 is now bunched up around the cat's neck 46. The second opening 32 is then pulled further down towards the cat's hind quarters 56 while feeding one and then the other of the legs 58 and 60 through the leg holes 34 and 36, in no particular order. The cover 22 is then straightened out such that the leg holes 34 and 36 are aligned with the legs 58 and 60 and the main body 28 thereof is not twisted. The cat's fur is then petted down underneath the cover 22. This process is acceptable to most animals and, with petting and encouragement from the human, the animal may come to enjoy the process of putting on the cover 22.

With the foregoing understanding of the operation of the basic invention in mind, the manufacture of the cover 22 will now be discussed. Initially, a hollow cylindrical blank having open ends is provided. This blank may be manufactured discretely or be cut from an elongate cylinder of fabric provided in a roll.

The first and second banded portions 38 and 40 may be woven into the blank or may be formed after the blank has been woven by folding back a portion of the blank and sewing the folded portion to the blank. The leg holes 34 and 36 are then formed by forming a slit or hole in the blank and forming the banded portions 42 and 44 around the slit or hole by stitching or the like. Again, the banding may be made using a variety and processes and materials and may provide the fabric with additional elasticity, but in any event the banding should prevent rolling and/or unraveling of the fabric.

The fabric from which the cover 22 is made is selected based on a number of criteria. First, the fabric must not be prohibitively expensive. The cover will normally be used only a few times at most (and washed between uses) and then is intended to be discarded. The disposable nature of the cover 22 thus prevents the use of expensive fabrics.

Second, the fabric must stretch and then recover so that the cover snugly fits the animal to be covered. In the context of the present application, "recovery" or "memory" is defined as the amount a fabric can be stretched along a line and then return to its original shape. The recovery or memory of a given fabric is determined by the materials and weave employed to make the fabric.

Referring for a moment back to FIG. 3, it can be seen that the cover 22 has a longitudinal axis identified by reference characters A–AA and a transverse axis identified by reference characters B–BB. In the exemplary cover 22, the amount of recovery along the longitudinal axis is approximately 20%, and the amount of recovery along the transverse axis is approximately 100%. More generally, the recovery along the longitudinal axis should be in a first preferred range of 5% to 30%, while the recovery along the transverse axis should be in a first preferred range of at least 100%. In any event, the amount of recovery along the longitudinal axis should be in a second preferred range of at least 5%, and the amount of recovery along the transverse axis should be in a second preferred range at least 80%.

In general, the diameter of the cylindrical fabric blank should be smaller than the smallest portion of the animal to be covered. The fabric will thus expand to allow the cover to be placed onto the animal and then retract (because of the fabric recovery or memory) to ensure a snug fit over the animal part being covered.

Third, the fabric must be capable of being knit or woven using conventional knitting or weaving machines and then sewn using conventional industrial sewing machines. For many animals, the formation of the banded portions 38–44 requires that stitches be formed on very small pieces of fabric. The fabric must stay in place on the sewing machine while the stitches are formed and must not stretch during the sewing process so that the final product is not distorted from the desired substantially cylindrical shape.

For covers 22 designed to fit smaller animals such as cats and dogs, it is possible, using conventional knitting machines, to knit the cylindrical blank without the use of seams. For larger animals such as horses, it may be necessary to knit the fabric into a rectangular sheet or sheets and then sew two edges together to form the cylindrical blank. It is also possible that conventional weaving machines can be specially designed to manufacture, without the formation of seams, closed cylinders for large animals. In either case, the larger blank is processed the same as a smaller blank, and if a seam is employed, the seam is arranged to be located in an inconspicuous location such as along the side or back of the animal.

A fourth major characteristic of the fabric from which the cover 22 is manufactured is that the fabric should be capable of being colored with natural colors such as gray, brown, tan, white, and/or combinations thereof. The cover 22 can be selected to match the color of the animal on which the cover 22 is placed. A colored cover may be desirable in some environments and is not as likely to attract attention as a white cover such as a sterile bandage or white plaster cast.

A fifth important characteristic of the fabric from which the cover 22 is made is that the fabric be breathable. In this respect, a woven or knitted fabric allows the fabric to breathe, thereby allowing the perspiration to evaporate and air to flow through the fabric to promote healing of the wound.

In addition to the more specific characteristics described above, the fabric from which the cover 22 is made should be fast drying, comfortable, tear resistant, and retain its elasticity or memory for its intended period of use.

Figures 4B, 5:
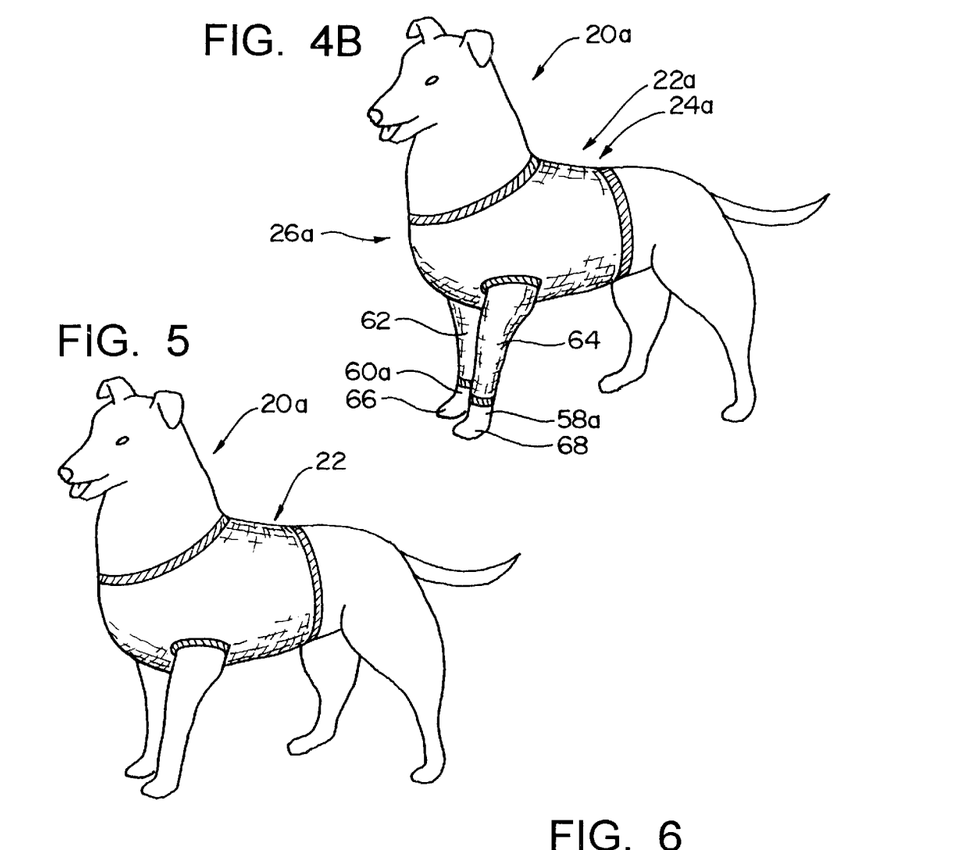
FIG. 5 is a perspective view of a dog wearing the cover of the first embodiment of the present invention.

Referring for a moment to FIG. 5, that figure depicts the cover 22 being worn by a dog 20a. It should be clear that the basic design principles illustrated in FIGS. 1–3 and 5 may thus be applied to other animals in addition to cats and dogs.

II. Second Embodiment

Referring now to FIGS. 4A and 4B, depicted therein is a cover 22a of a second embodiment of the present invention. The cover 22a is constructed in substantially the same manner as the cover 22 described above, but: (a) is designed to cover the dog 20a; and (b) is designed to cover a portion of the dog's legs 58a and 60a in addition to the dog's front quarters 26a.

Accordingly, in addition to a main body 28a, the cover 22a comprises first and second leg extensions 62 and 64 sewn to the main body 28a at the leg holes 34a and 36a. The leg extensions 62 and 64 are simply smaller (smaller diameter, shorter length) cylindrical pieces of the same material used to form the main body 28a, as described above with reference to the main body 28 of the cover 22. When the dog's legs 58a and 60a pass through the leg holes 34a and 36a, most of the dog's legs 58a and 60a are received within the leg extensions 62 and 64, with the dog's paws 66 and 68 exposed.

As with the main body 28a, the leg extensions 62 and 64 comprise banded portions 70 and 72 at their ends distal from the main body 28a. The other ends of the leg extensions 62 and 64 are sewn to the main body 28a.

The cover 22a will thus not only cover the dog's front quarters 26a, but a substantial portion of the dog's legs 58a and 60a are also covered. The cover 22a would be used in situations where a wound (not shown) is located on one or both of the dog's legs 58a and 60a. In this case, the main body 28a primarily functions to engage the dog's torso 24a to anchor the leg extensions 62 and 64 in place.

III. Third Embodiment

Figure 6:
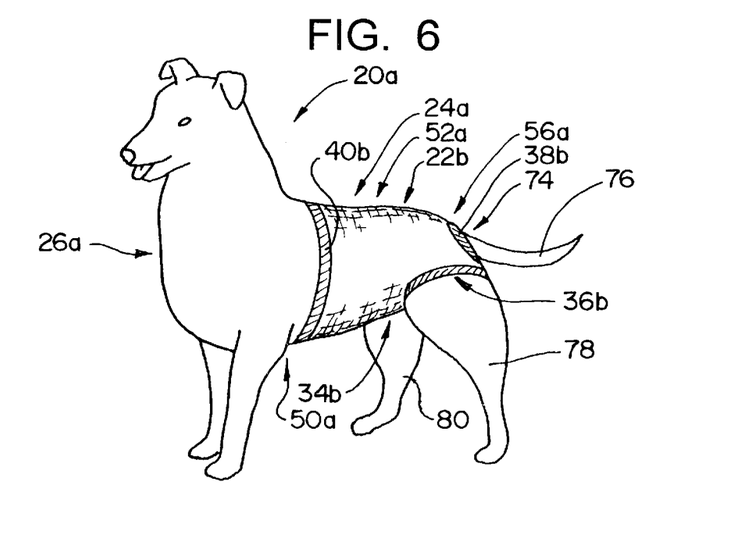
FIG. 6 is a perspective view of a dog wearing a cover of a third embodiment of the present invention.

Referring now to FIG. 6, depicted therein at 22b is a third embodiment of a cover of the present invention. The cover 22b is depicted on the dog 20a but can be applied to the cat 20 described above.

The cover 20b constructed in the same basic manner as and is similar in shape to the cover 20 described above. Except that rather than covering the dog's front quarters 26a, the cover 20b covers the dog's hind quarters 56a.

In particular, the cover 22b is simply reversed on the dog 20a such that the first opening 30b thereof is at a rear 74 of the dog 20a and the second opening 32b thereof is at the middle of the dog's torso 24a. In this context, the first banded portion 38b is arranged to fit around the dog's tail 76. The second banded portion 40b is arranged to fit around the dog's midsection 52a between the dog's front shoulders 50a and the dog's hind quarters 56a. The leg holes 34b and 36b are arranged such that the dog's hind legs 78 and 80 pass through these holes 34b and 36b. The cover 22b is thus held snugly against the dog 20a and covers the dog's entire hind quarters 56a during normal use.

A common use of the cover 22b is to protect a dog or cat that has been spayed or neutered. The cover 22b covers the location of the stitches from these operations and prevents the dog or cat from licking these stitches as generally described above.

For animals trained to defecate and urinate at regular times, the cover 22b may be removed prior to and replaced after the scheduled time. For other animals, this may not be possible, and at least a portion of the animal's hind quarters must be left uncovered to allow for normal defecation and urination. Defecation is accomplished through the opening 30 for both males and females. Females will be able to urinate through the opening 30, while males will require a separate opening for urination as will be described in further detail below. In any case, the shape of the cover 22b may be altered or contoured to facilitate the elimination of waste.

The cover 22b may be placed on the animal starting at either end. In particular, the process described above with reference to the cover 22 may be used with the cover 22b, but the process would be started from the rear end (tail) rather than front end (head) of the animal.

It may be more convenient, however, to start from the front end with the banded portion 40b facing front and the cover 22b in a narrow hoop. The animal's entire front quarters is placed through this hoop such that the cover 22b is arranged on the animal's midsection. The banded portion 38b is then pulled rearward while feeding first one and then the other of the animal's hind legs 78 and 80 through the holes 34b and 36b, in no particular order.

IV. Fourth Embodiment

Figures 7, 8:
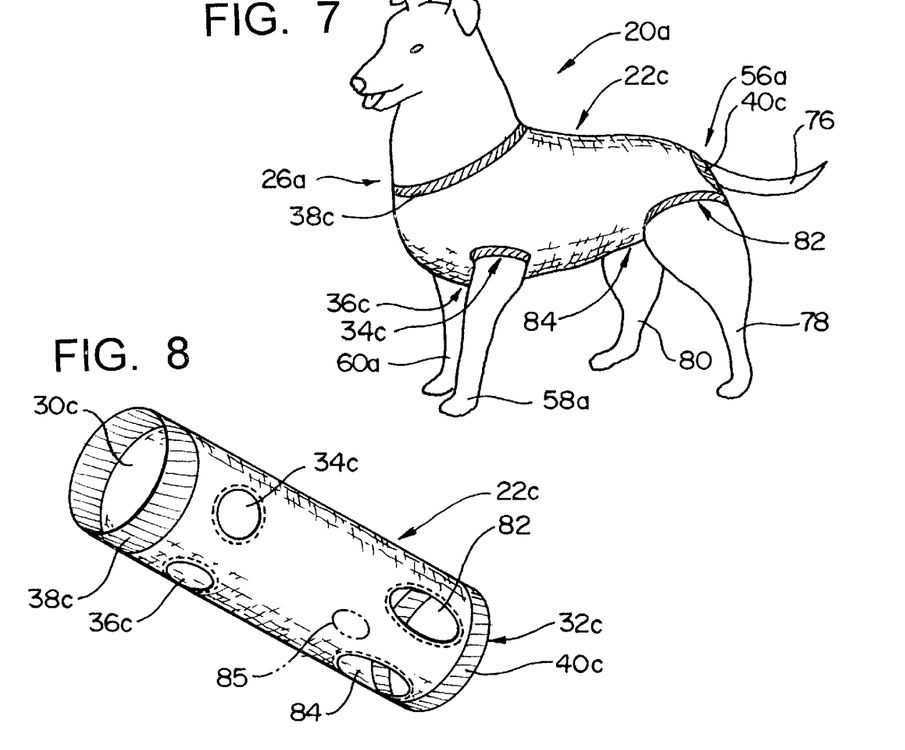
FIG. 7 is a perspective view of a dog wearing a cover of a fourth embodiment of the present invention.
FIG. 8 is a perspective view of the cover of the fourth embodiment.

Referring now to FIGS. 7 and 8, depicted therein at 22c is a fourth embodiment of a cover constructed in accordance with, and embodying, the principles of the present invention. As shown in FIG. 7, the cover 22c covers both the front and hind quarters 26a and 56a of the dog 20a.

Accordingly, the cover 22c is longer and comprises, in addition to first and second leg holes 34c and 36c, third and fourth leg holes 82 and 84. The front legs 58a and 60a extend through the first and second holes 34c and 36c, while the hind legs 78 and 80 extend through the leg holes 82 and 84.

A fifth hole 85 is preferably formed in the main body 22c to allow male animals to urinate. This hole 85 is formed slightly forward of the rear holes 82 and 84 and between these holes 82 and 84 when arranged along a circumference line.

The cover 22c is preferably placed on the animal starting at the front. The cover 22c may initially be gathered into a hoop and placed over the animal's head such that the head passes through both the first opening 30c and the second opening 32c. The first banded portion 38c is then left at the neck and the remaining portion of the cover 22c is drawn back to the animal's mid section while at the same time passing the front legs 58a and 60a through the first and second holes 34c and 36c. The second banded portion 40c is then drawn back such that the animal's tail extends through the second opening 32c and the second banded portion 40c is at the animal's rear. At the same time, the animal's hind legs are inserted through the third and fourth openings 80 and 82. The cover 22c is then straightened to ensure that is not twisted on the animal.

V. Fifth Embodiment

Figure 9:
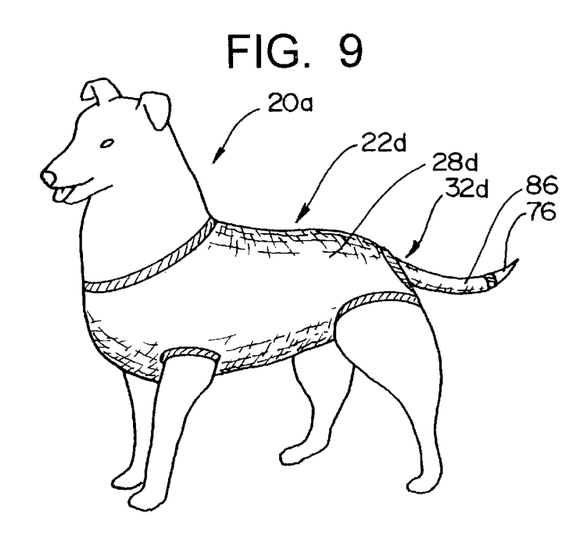
FIG. 9 is a perspective view of a dog wearing a cover of a fifth embodiment of the present invention.

Referring now to FIG. 9, depicted therein at 22d is a fifth embodiment of a cover of the present invention. The cover 22d is the same as the cover 22c just described except that the cover 22d further comprises a tail extension 86 adapted to cover the dog's tail 76. The purpose of the tail extension 86 is to cover a wound on the tail 76. The tail extension 76 may be used with the cover 22b of the third embodiment described above as well.

The tail extension 86 is formed in a manner similar to that of the leg extensions 62 and 64 described above but is formed from a smaller diameter blank and is sewn to the main body 28d immediately adjacent to the second opening 32d.

To place the tail extension 86 on the tail, the tail extension 86 is gathered into a hoop, passed over the end of the tail, and arranged adjacent to the animal's rear. A distal end of the tail extension is then drawn back so that the entire tail is covered.

VI. Sixth Embodiment

Figures 10, 11:
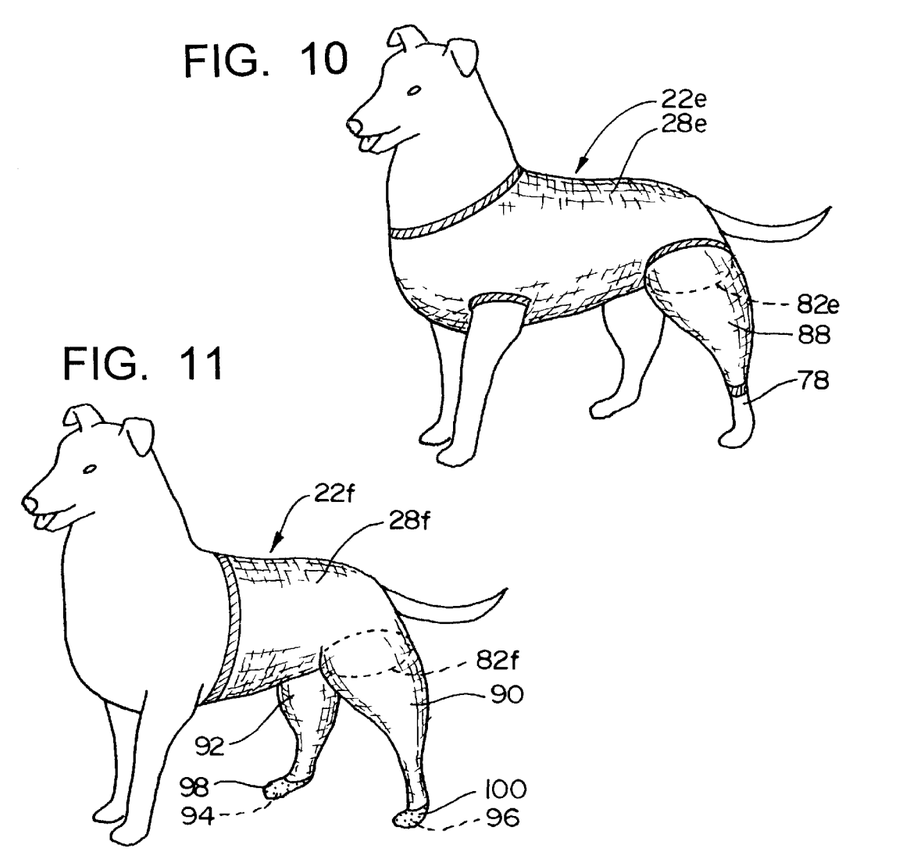
FIG. 10 is a perspective view of a dog wearing a cover of a sixth embodiment of the present invention.
FIG. 11 is a perspective view of a dog wearing a cover of a seventh embodiment of the present invention.

Referring now to FIG. 10, depicted therein at 22e is a sixth embodiment of a cover constructed in accordance with, and embodying, the principles of the present invention. The cover 22e is similar to the cover 22c described above but comprises a single leg extension 88. Like the leg extensions 62 and 64, the leg extension 88 is sewn to the main body 28e of the cover 22e. The leg extension 88 is sewn around the third leg hole 82e and covers most of the animal's right hind leg 78.

VII. Seventh Embodiment

Referring now to FIG. 11, depicted therein at 22f is a sixth embodiment of a cover constructed in accordance with, and embodying, the principles of the present invention. The cover 22f is similar to the cover 22b described above but in addition comprises first and second leg extensions 90 and 92. The cover 22f is also unique in that the leg extensions 90 and 92 are closed at their lower end such that hind paws 94 and 96 of the animal are closed. Optionally, the lower ends of the leg extensions 90 and 92 may be dipped in liquid rubber as shown at 98 and 100 to form booties that protect the paws 94 and 96.

Like the leg extensions 62 and 64 described above, the leg extensions 90 and 92 are sewn to the main body 28f of the cover 22f. The first leg extension 88 is sewn around the third leg hole 82f and covers the animal's right hind leg. The second leg extension 88 is sewn around the fourth leg hole (not visible in FIG. 11) and covers the animals left hind leg.

VIII. Eighth Embodiment

Figure 12:
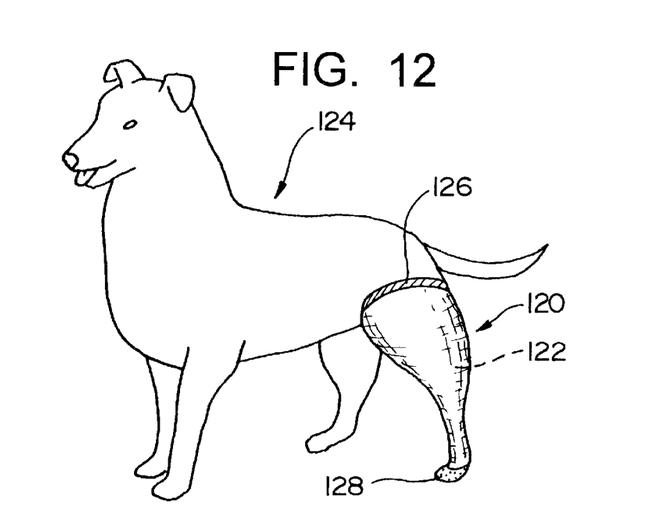
FIG. 12 is a perspective view of a dog wearing a cover of an eighth embodiment of the present invention.

Referring now to FIG. 12, depicted at 120 therein is yet another exemplary cover of the present invention. The cover 120 is designed to cover only a right hind leg 122 of the animal 124. The cover 120 comprises a banded portion 126 at its upper end and a closed lower end at which a bootie 128 is formed with liquid rubber. The use of a closed lower end and bootie 128 thereon is optional, however, and a cover with an open, banded lower end would serve much the same purpose as the cover 120.

The banded portion 126 will secure the upper end of the cover 120 to the animal, while the bootie 128 (or optional banding) will secure the lower end to the animal. The cover 120 will be slightly less secure than covers that at least partially surround the animal's torso, but the cover 120 will be less intrusive and easier to put on and take off.

The cover 120 is manufactured of the same materials and in a similar manner to the covers described above. In particular, the cover 120 starts out as a cylindrical blank with two open ends. The upper end is banded and the lower end is closed and dipped in liquid rubber or left open and banded.

IX. Ninth Embodiment

Figure 13:
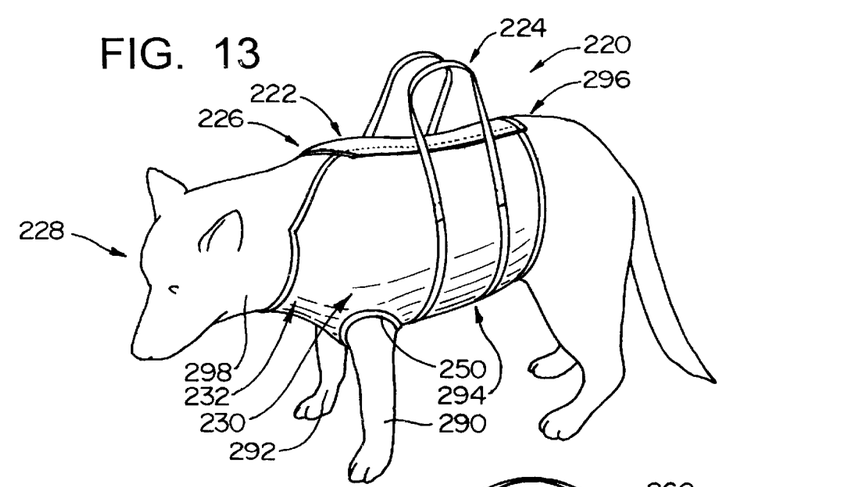
FIG. 13 is a perspective view of a dog wearing a cover of a ninth embodiment of the present invention.
Figure 14:
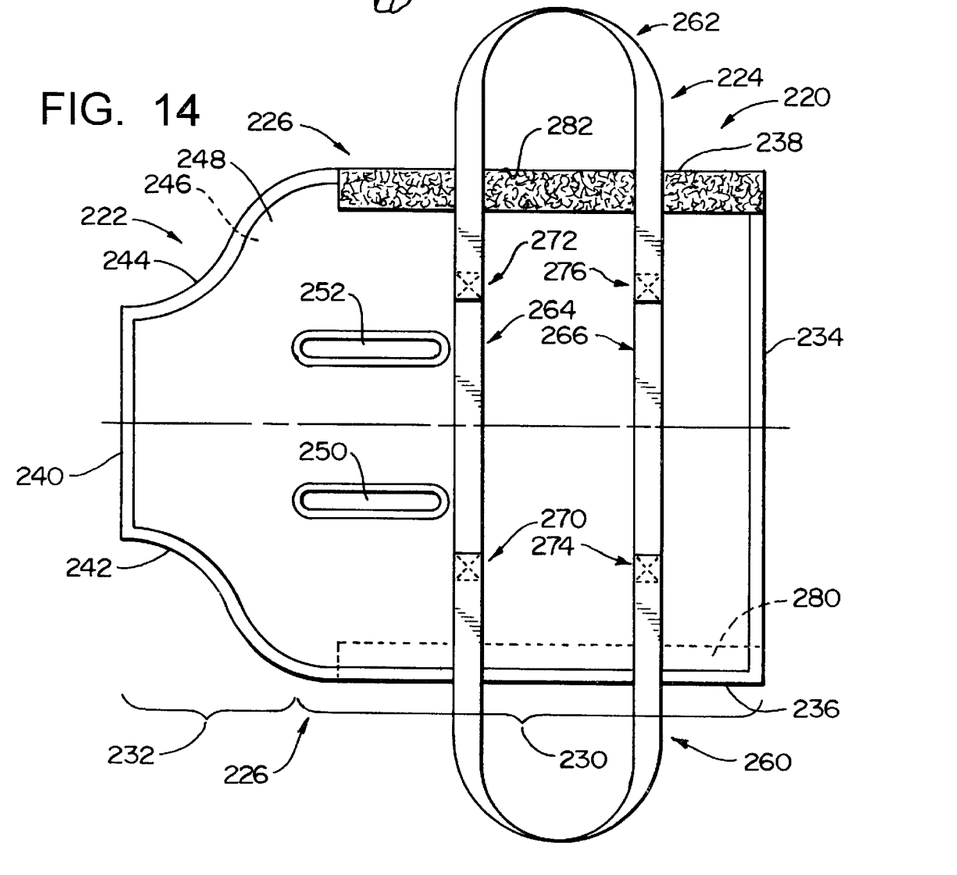
FIG. 14 is a top plan view of the cover of FIG. 13.

Referring now to FIGS. 13 and 14, depicted at 220 therein is yet another protective cover constructed in accordance with, and embodying, the principles of the present invention. The cover 220 comprises a sheet of material 222, a strap member 224, and a fastening system 226. The cover 220 is shown around an exemplary animal 228, which in this case is a dog.

The material from which the sheet 222 is fabricated is preferably the same as that used by the other embodiments of the invention as described herein, but other materials may be used. The sheet 222 itself is cut to define a main portion 230 and a neck portion 232. The main portion 230 is generally in the shape of a rectangle and defines a rear edge 234 and first and second main side edges 236 and 238. The neck portion 232 defines a front edge 240 and first and second neck side edges 242 and 244. The neck side edges 242 and 244 are curved to reduce the overall width of the sheet 222 from the main portion 230 to the front edge 240. The sheet 222 defines an inner surface 246 that engages the animal being protected and an outer surface 248.

First and second leg holes 250 and 252 are formed in the main portion 230 of the sheet 222 adjacent to the neck portion 232. The distance between the leg holes 250 and 252 should be approximately the same as the distance between the front legs of the animal to be assisted by the cover 220. In the exemplary embodiment 220, the leg holes 250 and 252 are spaced approximately the same distance from each other as they are from the adjacent main side edges 236 and 238.

The strap member 224 is arranged in an elongate closed loop to define first and second side portions 260 and 262 and front and back portions 264 and 266. The front strap portion 264 is sewn to the outer surface 248 of the sheet 222 at first and second locations 270 and 272 immediately to the rear of the leg holes 250 and 252. The rear strap portion 266 is sewn to the sheet outer surface 248 at first and second locations 274 and 276 spaced towards the rear edge 234 from the locations 270 and 272. The front and back portions 264 and 266 are sewn to the sheet 222 such that the first and second side strap portions 260 and 262 extend substantially symmetrically to either side of the sheet side edges 236 and 238 although other arrangements are possible.

The fastening system 226 is formed by a hook and loop fastener having a hook portion 280 and a loop portion 282. The hook portion 280 and loop portion 282 are elongate rectangles that are sewn along the first side edge 236 and second side edge 238 of the sheet 222, respectively. In the exemplary cover 220, hook portion 280 is sewn to the inner sheet surface 246, and the loop portion 282 is sewn to the outer sheet surface 248. The relative positions of the hook and loop portions 280 and 282 can be changed without affecting the operation of the cover 220. In addition, while a hook and loop fasteners is preferred, other fastening systems, such as buttons, zippers, snap fasteners, and the like may be used instead.

In use, the animal's left and right front legs 290 and 292 are placed through the first and second leg holes 250 and 252. The sheet 222 is then folded around the animal such that the front and back strap portions 264 and 266 extend under the animal's midsection 294. The sheet 222 is sized relative to the animal 228 such that the sheet side edges 236 and 238 overlap just enough for the hook portion 280 to engage the loop portion 282 and form a seam 296 the extends along the top of the animal's midsection 294. The neck portion 232 is arranged under and supports the animal's neck 298.

The side portions 260 and 262 of the strap 226 may be grasped together above the animal's midsection 294 and the seam 296. Because the front and back portions 264 and 266 of the strap 226 extend under the animal's midsection 294, lifting the side strap portions 260 and 262 lifts the midsection 294. At the same time, the animal's neck 298 is supported by the neck portion 232 of the cover 220. The animal 228 may simply be lifted to a standing position, or may be carried or lifted up to a higher surface such as an examination table or the like.

The strap member 224 bears most of the weight of the animal 228, while the sheet 222 spaces the front and rear strap portions 264 and 266 such that the weight of the animal 228 is evenly distributed to the strap member 224 such that the animal 228 is balanced when supported by the cover 220.

X. Tenth Embodiment

Figure 15:
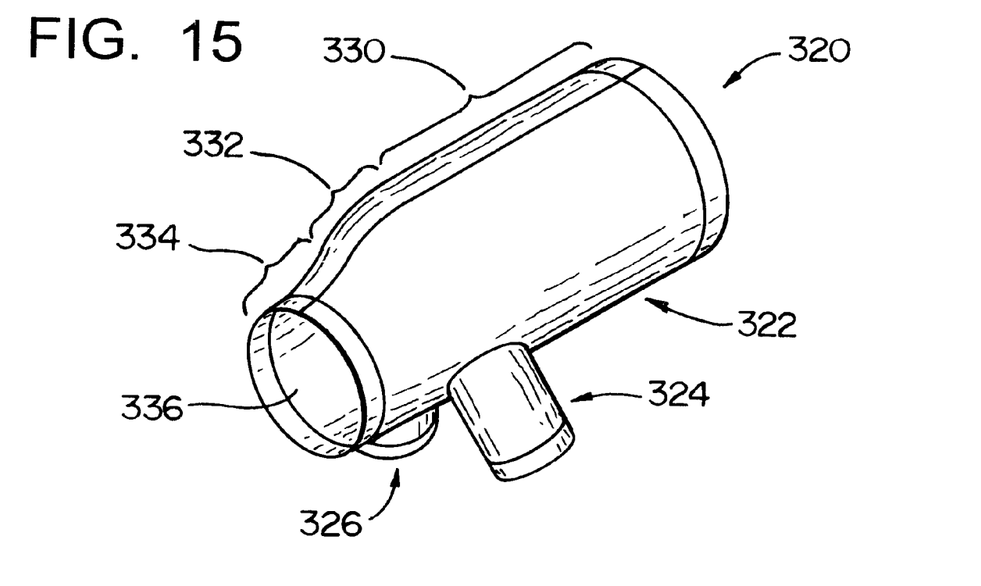
FIG. 15 is a perspective view of a cover of a tenth embodiment of the present invention.

Referring now to FIG. 15, depicted therein is yet another exemplary cover 320 embodying the principles of the present invention. The exemplary cover 320 is generally similar to the embodiment described above with respect to FIG. 4A. In particular, the cover 320 comprises a main portion 322 and first and second leg portions 324 and 326. The main portion 322 is adapted to cover the body of an animal, while the animal's legs extend through the leg portions 324 and 326.

The exemplary main portion 322 comprises a back portion 330, a shoulder portion 332, and a neck portion 334. The back portion 330 is generally cylindrical and is sized and dimensioned to snugly receive the animal's midsection. The shoulder portion 332 is sized and dimensioned to fit the animal's shoulders. The neck portion 334 is sized and dimensioned to fit the animal's neck.

In particular, the diameter of the neck portion 334 is reduced relative to the diameter of the back portion 330. This reduction in diameter begins at the shoulder portion 332 and ends at a neck opening 336 defined by the neck portion 334.

The diameter reduction described above may be formed by starting a substantially cylindrical blank, forming a V-shaped notch adjacent to the neck opening 336, and sewing the notch edges together. Alternatively, this diameter reduction may be formed by starting with a generally rectangular blank, cutting off two corners of the rectangle, and forming a seam by sewing two opposite edges and cut edges of the blank together. Such a seam is shown at 338 in FIG. 15, but the use of a seam is not necessary to obtain the shape depicted in FIG. 15 and/or to implement the principles of the present invention.

XI. Materials

The general properties of the fabric from which the cover the present invention will be manufactured were discussed above. In this section, the preferred fabrics used to create a cover according to the teachings of the present invention will be described in detail.

The fabric from which the exemplary covers discussed above are made is preferably a knitted material comprised of the materials set forth in the following Table A:

TABLE A

| Material | Preferred | First Preferred Range | Second Preferred Range |
| --- | --- | --- | --- |
| Elastic material | 40% | 20–80% | 20–100% |
| Breathable material | 60% | 20–80% | 0–80% |

The elastic material preferably is a fiber comprising a natural rubber or a synthetic rubber core to which is bonded a material such as nylon, cotton, and/or polyester. Commonly available elastic materials are Lycra, Spandex, or equivalents thereof. These elastic fibers are important to the amount of memory or recovery of the fabric.

The preferred elastic materials are breathable, and the cover may be made entirely from these elastic materials. But these materials are also expensive, so the breathable material is preferably knitted with the elastic material. The breathable material is a blend of a polymeric synthetic material such as polyester, nylon, or the like and a natural material such as cotton, wool, or the like. The breathable material will normally be less expensive than the elastic material and should allow air and vapor to pass through the fabric.

The elastic material and breathable material are preferably knitted together to form an acceptable fabric. Knitting of these materials is preferable because knitting forms connected loops that enhance the memory or recovery of the fabric. A woven fabric may also be used but would likely require a higher percentage of elastic material to obtain the required memory or recovery.

XII. Manufacturing and Use Considerations

From the foregoing, it should be clear that the covers of the present invention can be embodied in a large number of different forms depending upon the size of the animal and the nature of the wound. For manufacturing and inventory considerations, however, it may be desirable to employ one design that is implemented in a limited variety of different sizes and colors. The veterinarian or other person applying the cover can then modify the cover on site to fit the needs of a particular animal.

For example, it may be desirable to manufacture at least one basic design comprising a main body and four leg extensions. In this case, the middle of the main body and the junctures of the leg extensions are preferably banded on either side of a cut line so that the veterinarian can cut the basic design at the cut line or lines to form one of the more specialized designs described above. The banded portions on either side of the cut line will prevent unraveling of the fabric where the cuts are made.

It may also be desirable to provide the veterinarian with a cylindrical blank in which leg holes have not been cut. In this case, a liquid banding material may be applied in a circular or oval shape at the approximate locations where the leg holes should be formed. The veterinarian will then form cut the fabric within the banded region to fit the individual animal. The banded region will prevent unraveling of the fabric at the cut.

An animal that has been spayed may require only the configuration described with reference to FIG. 6, in which case the main body portion will be cut and the front portion discarded. The two hind leg extensions may also be cut and discarded.

An active animal with a stitched left hind leg may require the removal of all of the leg extensions except for the one required to cover the stitches, as is shown in FIG. 10. The main body portion would be left intact to insure that the wound stays covered even if the animal engages in rough play or the like. In practice, the veterinarian may "prescribe" the number of covers provided and the intervals at which they are to be changed. For example, if a veterinarian determines that the wound should be protected for six days, the veterinarian may send the animal home wearing one cover and with two extra covers. The animal's owner would change the cover on the second and fourth days and then remove the last cover on the sixth day.

From the foregoing, it should be clear that the present invention may be embodied in forms other than those discussed above; the scope of the present invention should be determined by the following claims and not the detailed discussion presented above.

What is claimed is:

1. A cover for an animal, comprising:

a main body defining first and second leg holes and first, second, third and fourth edges;

a strap member sewn to main body to define front and back portions and first and second side portions; and a fastening system arranged to join the first and second edges of the main body such that the main body is adapted to extend around at least a portion of the animal with portions of the animal extendable through first and second open ends of the main body, and the front and back portions of the strap member adapted to extend under a midsection of the animal with the first and second side portions of the strap member arranged above the animal; wherein the third and fourth edges are substantially parallel; whereby when the cover covers the animal, grasping the first and second side portions of the strap member allows a portion of the animal behind the front legs to be lifted with the weight of the animal being borne in part by the strap member.

2. A cover for an animal as recited in claim 1, in which the main body is defined by a sheet of material and the first and second edges are joined at a seam by the fastening system.

3. A cover for an animal as recited in claim 2, in which the fastening system detachably attaches the first and second edges at the seam.

4. A cover for an animal as recited in claim 3, in which the fastening system is formed by at least one of:

a hook and loop fastening system;

at least one button;

at least one snap fastener; and a zipper.

5. A cover for an animal as recited in claim 2, in which the seam is arranged between the first and second side portions of the strap member.

6. A cover for an animal as recited in claim 2, in which fastening system permanently attaches the first and second edges at the seam.

7. A cover for an animal as recited in claim 6, in which the seam is formed during manufacture such that the main body is generally in the shape of a hollow cylinder.

8. A cover for an animal as recited in claim 1, in which the main portion is substantially cylindrical.

9. A cover for an animal as recited in claim 1, in which the main body comprises a neck portion that is adapted to extend underneath a neck of the animal.

10. A cover for an animal as recited in claim 1, in which the third edge is arranged in front of the animal's front legs and the fourth edge is arranged in front of the animal's hind legs.

11. A cover as recited in claim 10, in which the leg holes are arranged between the third edge of the main portion and the strap member.

12. A cover as recited in claim 11, in which the strap member is arranged between the leg holes and the fourth edge.

13. A cover as recited in claim 10, in which the strap member is arranged between the leg holes and the fourth edge.

14. A cover as recited in claim 1, in which:

a first direction is defined from the third edge of the main body to the fourth edge of the main body and a second direction is defined as orthogonal to the first direction; and the main body is made of a fabric having a recovery in the first direction of at least five percent and in the second direction of at least eighty percent.

15. A cover as recited in claim 14, in which the fabric of the main body has a recovery in the first direction of substantially between five and thirty percent and in the second direction of at least one hundred percent.

16. A cover as recited in claim 15, in which the fabric of the main body has a recovery in the first direction of approximately twenty percent and in the second direction of approximately one hundred percent.

17. A cover for an animal as recited in claim 1, in which the main body extends uninterrupted from the third edge to the fourth edge between the first and second leg holes.

* * * * *